United States Patent [19]

Brown et al.

[11] Patent Number: 4,554,650
[45] Date of Patent: Nov. 19, 1985

[54] OIL FILLED TOWED ARRAY HOSE WITHOUT COUPLINGS

[75] Inventors: Douglas E. Brown, East Lyme; William Matthews, Baltic, both of Conn.

[73] Assignee: The United States of America as represented by the Secretary of the Navy, Washington, D.C.

[21] Appl. No.: 364,818

[22] Filed: Apr. 2, 1982

[51] Int. Cl.$^4$ .................. H04R 17/00; H04R 15/00
[52] U.S. Cl. .................................. 367/154; 367/169; 367/155; 174/47
[58] Field of Search ............... 367/149, 155, 157, 166, 367/177, 154, 171, 180, 20, 58, 191; 29/173

[56] References Cited

U.S. PATENT DOCUMENTS

| | | | |
|---|---|---|---|
| 3,434,104 | 3/1969 | Stapleton et al. | 367/154 |
| 3,474,253 | 10/1969 | Kessler | 367/191 X |
| 3,531,760 | 9/1970 | Whitfill, Jr. | 367/154 X |
| 3,903,497 | 9/1975 | Stimler et al. | 367/149 X |
| 4,078,223 | 3/1978 | Strange | 367/58 |
| 4,090,168 | 5/1978 | Miller et al. | 367/154 X |
| 4,241,427 | 12/1980 | Swenson | 367/20 |
| 4,375,680 | 3/1983 | Cahill et al. | 367/149 |
| 4,491,939 | 1/1985 | Carpenter | 367/20 |

OTHER PUBLICATIONS

Ovid W. Eshbach, Handbook of Engineering Fundamentals, John Wiley & Sons, Inc., New York, Mar. 1958, pp. 5-15.

Primary Examiner—Charles T. Jordan
Assistant Examiner—Brian S. Steinberger
Attorney, Agent, or Firm—Robert F. Beers; Arthur A. McGill; Michael J. McGowan

[57] ABSTRACT

A long, continuous, constant diameter, neutrally buoyant oil filled line array hose without couplings comprising a plastic inner hose having a layer of conducting and/or optical fibers wrapped helically around and bonded to the outer periphery along the neutral axis thereof. A strength member layer is encased within and bonded to an outer plastic sleeve which covers the conducting layer. Sensors are placed within the inner hose cavity through incisions formed at predetermined locations, attached to the conducting layer, and sensor-conductor junctions are sealed with a waterproof coating; the incisions are then chemically sealed. The hose cavity is filled with an insulating oil providing a continuous, oil filled constant diameter, line array hose devoid of coupling members.

11 Claims, 6 Drawing Figures

OIL FILLED TOWED ARRAY HOSE WITHOUT COUPLINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to acoustic line arrays and more particularly to a long, continuous, constant diameter neutrally buoyant, pliable plastic hose, towed array without couplings having strength members and electrical conductors embedded within and between the hose wall materials.

2. Description of the Prior Art

Oceanographic, engineering and acoustic data are presently gathered in the seas by towing arrays of sensors, placed within a long string of reinforced pliable plastic oil filled hose sections. The oil is very light and serves the double function of providing electrical insulation and neutral buoyancy. This assembly of sections, comprising a towed array, can be as long as several thousand feet and vary in diameter from less than one inch up to four inches, depending on the sensor requirements. From an acoustic standpoint, a constant diameter array is preferred in order to minimize flow noise.

Existing towed arrays terminate the strength members and electrical conductors in sectional end couplings, which occur at least every 300 feet. Long fabrication areas are required because in order to place sensors within the hose cavity, the hose must be expanded. This is accomplished by placing a hose section inside a 300 foot long vacuum chamber and pulling a vacuum on the outside of the hose. The strength members, conductors and sensors are assembled on the top of long benches, normally placed next to the vacuum chamber. The strength members are tensioned and the other elements are tied on. Next the assembled conductors, sensors and strength members are pulled into the hose section. Finally the couplings are attached to the hose section ends and sealed, and the hose section is filled with the lightweight oil. A plurality of such assembly of hose sections are assembled and connected end to end to construct a towed array which may be several thousand feet long.

Each mechanical and electrical coupling represents a potentially unreliable piece of hardware. They are relatively heavy compared to the other array components, being typically made of metal such as titanium, and are very expensive to machine. In addition, highly skilled personnel are required for the difficult and tedious task of terminating the strength members at each coupling. The electrical connectors are of necessity normally small in diameter resulting in the pins being placed very close together. This leads to potentially serious safety problems when high voltages are used during array operation. Also, since the couplings are heavy, local sagging occurs at each coupling while the array is being towed. This dip in an otherwise neutral, horizontal array produces flow separation resulting in flow noise which causes a reduction in the acoustic performance of the array. There is also evidence that the couplings act as shiny lures for fish to attack which also degrades array linearity.

SUMMARY OF THE INVENTION

Accordingly, it is a general purpose and object of the present invention to provide a constant diameter line array. It is a further object to provide an array made without intersectional couplings. Another object is that the array be neutrally buoyant. A still further object is that the strength members and conductors be embedded within and between the hose walls. A still further object is that array sensors may be field repaired without requiring long work benches and/or long vacuum chambers.

These objects are accomplished with the present invention by providing an oil filled, constant diameter, line array hose without intersectional couplings for towing by submarines and surface ships which comprises a long, continuous pliable plastic inner hose with a layer of conducting and/or optical fibers wrapped thereover about the stress free neutral axis. This inner hose/conductor layer is covered by a strength member layer where the strength members are encased within and bonded to an outer smooth, pliable plastic hose. Acoustic sensors are placed within the inner hose cavity through carefully made incisions at desired locations, are attached to the conductors thereat, the sensor/conductor junctions are sealed with a waterproof coating and the incisions then closed and chemically sealed. After sensor installation throughout the array the hose cavity is filled with a buoyant, electrically insulating oil. The resulting hose assembly is repairable at sea and eliminates; mechanical or electrical couplings at each sensor, threading of long wire bundles through the hose, local sagging due to concentrated connector weight, "fishbite" problems, and the need for special assembly areas/equipment. Reliability is improved, fabrication is signficantly less expensive and acoustic detection performance is improved owing to reduced self noise resulting from the low drag forces associated with the smooth constant diameter outer hose surface and the absence of noncollinearity due to local sagging.

DESCRIPTION OF THE PREFERRED EMBODIMENT

Figure 1:
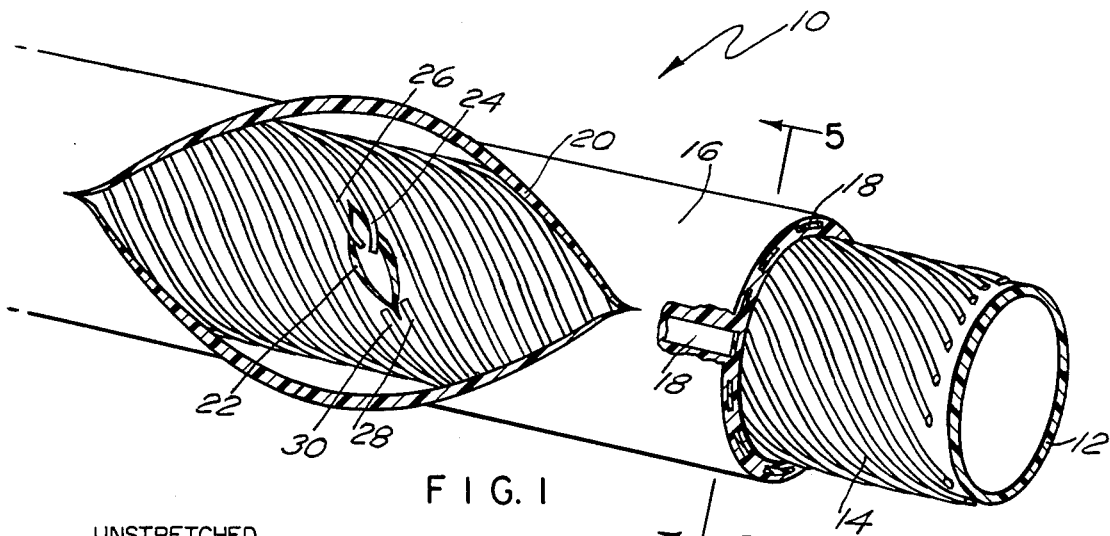
FIG. 1 shows a perspective view of an array hose built according to the teaching of subject invention.

Referring now to FIG. 1 there is shown a line array hose without intersectional end couplings. Multi-layer hose 10 comprises a pliable plastic inner hose 12, of polyurethane material or the like, having a plurality of conductors 14 wrapped helically around hose 12 along the neutral axis thereof. Conductors 14 are typically stranded copper wire, with sizes variable from American Wire Gage (AWG) 12 to AWG 30, jacketed with polyvinyl chloride or a similar plastic, and/or optical fibers which are double plastic jacketed glass. Conductors 14 carry energy to array sensors and return data in the form of modulated energy to the towing ship or vehicle. Conductors 14 are secured to hose 12 by solvent bonding of the plastic jackets of the conductors to the outer surface of hose 12. In this way, conductor orientation with respect to each other and to the neutral axis of hose 12 is maintained thus preventing conductor crossover and/or pinching which could lead to conductor insulation breakdown or some other electrical or optical failure mode. An outer hose 16 of polyurethane or the like, having a plurality of embedded strength members 18, covers hose 12 and attached conductors 14. Outer hose 16 provides a smooth exterior surface for towing, which reduces the drag forces as the array is towed. With the tension due to the drag forces thus lowered, the quantity of strength members can be reduced, thereby lessening costs. The outer hose also provides the means to entrap strength members 18 such that there is no relative motion between them under cyclic tension loading preventing the strength members from chafing on one another, which would quickly decrease the array's total strength. Outer hose 16 also provides the first seal against seawater intrusion. Embedded strength members 18, of Kevlar 49 ribbon or the like, are layed parallel to the hose axis at from 50% to 95% coverage, based on the desired array strength and weight requirements. While Kevlar 49 ribbon has been described, it is understood that the strength member can be of other material, e.g., steel, or synthetics, e.g., polyesters or polyamids. Individual strength members that are made up of twisted strands or fibers will have adjacent members selected to have alternate and equal lay angles. Strength members can also be made of symmetrical braid or straight fibers, which will not require such alternating. This attention to torque effects will ensure that the array will be torque free; that is, it will not tend to twist when stressed longitudinally. Such torque-balancing is necessary for an acoustically quiet array, from a self-noise standpoint. Also, by helping to keep the conductors from stretching or being placed in compression, data transmission degradation associated with wire and fiber stress is reduced.

The technique for inserting each internal sensor is as follows: Hose 10 is layed out on a convenient work surface, e.g. a 5 meter long work bench. As seen in FIG. 1, a shallow incision 20, having the cut depth controlled such that the conductors 14 are not touched, is made parallel to the hose axis. Care must be taken not to cut strength members 18, therefore incision 20 must be made between two adjacent strength members. Cut 20 may be as long as 2 meters. The sides of cut 20 are pulled aside and a second incision 22 is made parallel to the neutral axis and between any two conductors 14. A sensor is inserted through incision 22 and secured appropriately to the inside of inner hose 12. These sensors may be engineering, oceanographic or acoustic in nature; active, passive or dummy, such as oil blocks. For example, a passive acoustic sensor would be a hydrophone. Sensors can be either rigidly mounted to the walls or suspended within compliant mounts, such as open cell foam which is used in existing arrays. After securing the sensor, the two conductors adjacent to the incision 22 are severed so as to produce four ends 24, 26, 28 and 30. The two ends connecting directly back to the tow vessel, in this case 24 and 26, have their jackets stripped back and are attached to the sensor leads using electrical junctions. The junctions are given a water-proof coating and then inner cut 22 and outer cut 20 are chemically sealed using a plastic solvent. The remaining sensors are installed in a similar fashion and then the array is filled with light, buoyant oil such as kerosene.

The laying of conductors 14 along the neutral axis of hose 12 is crucial to this invention in that stress on the conductors is thereby kept at levels commensurate with minimum signal distortion despite array drag force tension.

Figure 2:
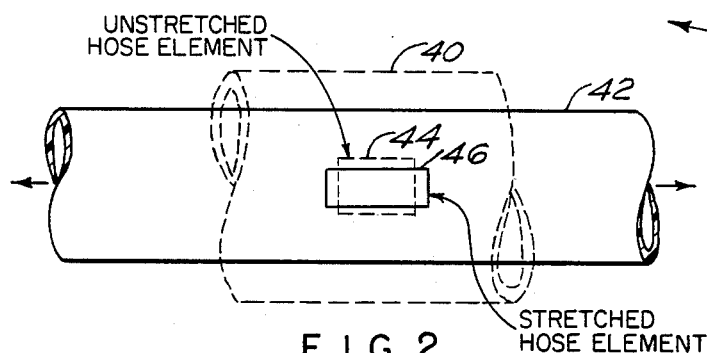
FIG. 2 represents a pictorial view of a typical hose section under axial tension.
Figure 3:
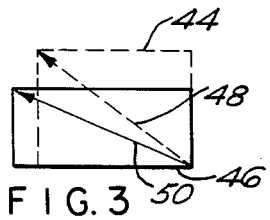
FIG. 3 shows a blown-up view of a stressed element of the hose section of FIG. 2.
Figure 4:
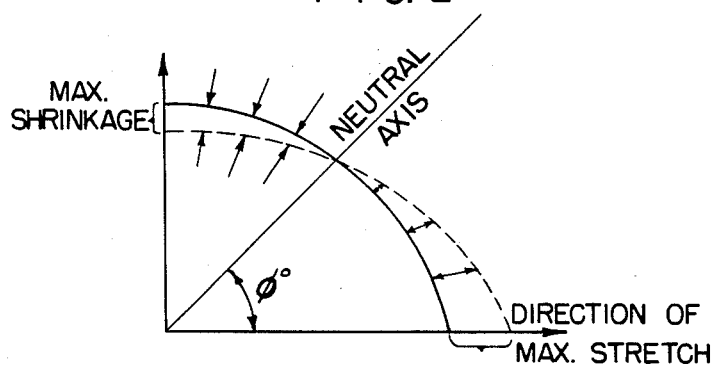
FIG. 4 is a graph representing the neutral axis concept and relative angular location.

FIGS. 2, 3 and 4 describe the concept of a neutral axis for a hose in a relaxed state and under tension. As shown in FIG. 2, when all hose type arrays are pulled, the hose stretches. An unstressed hose section 40 necks down and elongates to take the shape of hose section 42 (shown exagerated). Concurrently, an element 44 on unstretched hose 40 also changes shape to that of element 46. FIG. 3 shows an enlarged view of elements 44 and 46 where the elements have had one corner juxtaposed. A diagonal line 48 of unit length is shown after shifting angle under tension to become diagonal line 50. Line 50 is of equal length with line 48 for the tension shown. To analyze the shift in the neutral axis consider the following: The amount of increased hose length is determined primarily by the total force applied to the array and the strength of the hose assembly. For a hose filled with a fluid and sealed up, conservation of mass, ignoring relativistic effects, holds—that is, the elongated hose still has the same volume of fluid in it as it is held at its original length. Since an array normally operates at pressures much higher than the vapor pressure of the fluid, the fluid cannot turn gaseous, hence the internal volume does not change except a very little amount due to the compressibility of the fluid. Knowing the compressibility of the fluid and the amount of increased length, the decrease in diameter of the hose may readily be calculated. Since the hose diameter has decreased, so has the circumference. The relationship between the amount of stretch in the longitudinal direction and the decrease in length in the circumferential direction can be established. Note that these two "primary" strain directions are at 90 degrees to one another. In one primary direction is the maximum elongation, and in the other primary direction is the maximum shrinkage. Plotting these two vectors tail-to-tail, maximum stretch to the right and maximum shrinkage vertically produces FIG. 4. Rotating from one primary direction toward the other and plotting the change in length from maximum stretch to maximum shrinkage, an angle will be reached where no change in length occurs. This angle defines the "neutral axis." If conductors are placed parallel to this axis, they will neither stretch nor shrink as the hose elongates.

The angle of the neutral axis for a differently tensioned hose of the same strength would be different. That angle change is small, however. If the angle chosen is for a Kevlar 49 strength member, stressed to 20 percent of its breaking strength, the angle is about 50 degrees. If the array were stressed to 60 percent of its breaking strength, the conductors would experience less than 0.2 percent stretch. This is well within the elastic limit of most conductors and optical fibers. For a particular array the diameter, weight and drag forces are calculated to arrive at the operating tension force the array will experience in service. This force is then used along with other hose physical parameters to calculate length change, circumference change and thence to determine optimum neutral axis angle.

Figure 5:
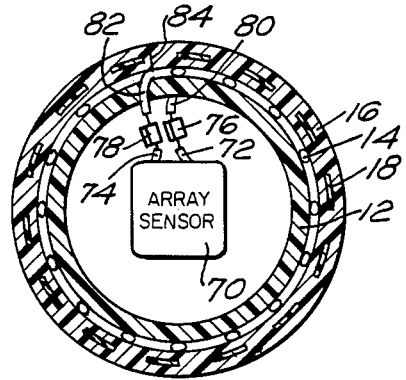
FIG. 5 is a cross sectional view of FIG. 1, taken along line 5—5 thereof, showing an installed sensor.

Referring now to FIG. 5 there is shown a cross sectional view of hose 10 taken at a typical location on the array where a sensor 70 has been installed. Outer hose 16 and inner hose 12 are shown with their incisions sealed. Sensor 70 has leads 72 and 74 as a part thereof which leads are joined at junctions 76 and 78 respectively to conductors 80 and 82 respectively. Conductors 80 and 82 are the severed ends of two adjacent conductors 14 which were threaded through the incision in the inner hose and have had a portion of their protective jacket stripped back. Closed incision line 84 is shown solvent bonded together.

Figure 6:
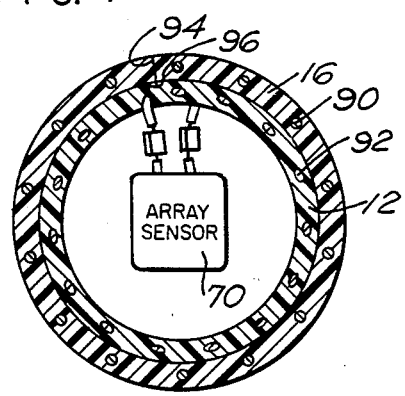
FIG. 6 is a cross section of an alternate hose built according to the teachings of subject invention.

FIG. 6 shows an alternate sectional view of another hose configuration. Here the strength members 90 in hose wall 16 are of a round shape. The plurality of helically wound conductors 92 are embedded within inner hose 12. Sensor 70 is attached as described above except that when severing the two adjacent conductors additional shallow incisions in the outer surface of the inner hose must be made to access each conductor taking care not to cut the conductor.

The biggest single advantage of the instant array is that it requires no intersectional end couplings. The very expensive mechanical terminations previously required for each array section end are eliminated as well as the need to attach these couplings to the array strength members. Also, not required are multi-pin molded electrical connectors for each intersectional end coupling which are expensive, are generally long lead-time items and not totally reliable. Since couplings in existing arrays cause local sagging at each section joint while being towed, especially at low tow speeds, the elimination of intersectional couplings provides a very straight and level array. If indeed the existing sagging shiny couplings invite fishbite, this problem is also eliminated. Because there are no wire bundles to pull into the hole cavity, there is no limit to the array length. This eliminates the need for very expensive and rather unique fabrication areas. Vacuum chambers, pressure facilities, fabrication benches as long as 300 feet, and tensioning equipment are not needed. Since there are now no wire bundles within the array, somewhat larger diameter sensors and signal conditioning units may be accommodated. Additionally, replacement of failed sensors does not require vacuum chambers, hence repair or replacement of failed units can be done at sea.

What has thus been described is an oil filled, constant diameter, line array hose without intersectional couplings for towing by submarines and surface ships which comprises a long, continuous pliable plastic inner hose with a layer of conductors and/or optical fibers wrapped thereover parallel to the stress free neutral axis. This inner hose/conductor layer is covered by a strength member layer where the strength members are encased within and bonded to an outer smooth, pliable plastic hose. Acoustic sensors are placed within the inner hose cavity through carefully made incisions at desired locations, are attached to the conductors thereat, the sensor/conductor junctions are sealed with a water-proof coating and the incisions then closed and chemically sealed. After sensor installation throughout the array the hose cavity is filled with a buoyant, electrically insulating oil. The resulting hose assembly is repairable at sea and eliminates mechanical or electrical couplings at each sensor, threading of long wire bundles through the hose, local sagging due to concentrated connector weight, "fishbite" problems, and the need for special assembly areas/equipment. Reliability is improved, fabrication is significantly less expensive and acoustic detection performance is improved owing to reduced self noise, resulting from the low drag forces associated with the smooth constant diameter outer hose surface and the absence of noncollinearity due to local sagging.

Obviously, many modifications and variations of the present invention may become apparent in light of the above teachings. For example, the hose wall material could be any of several other compounds or combinations of materials such as PVC, polypropylene and ethy-vinyl acetate. The manufacturer can extrude the assembly with one to four passes. The strength members can be steel, polyamids, polyesters or any other low stretch relatively lightweight synthetic. The individual strength member construction can be individual yarns, right or left lay ropes, ribbon construction or of parallel lay bundles. The conductor bundle may be jacketed or bare, stranded copper or aluminum. It can contain optical fibers. The sealing of the insertion slices, in addition to solvent bonding can be done by glued patches, soft epoxies or combinations. It is therefore understood that within the scope of the appended claims, the invention may be practiced otherwise than as specifically described.

We claim:

1. A continuous, oil filled towed array without intersectional couplings comprising:
   a long continuous inner pliable plastic hose having an internal cavity therethrough;
   a plurality of conductors wrapped helically around and bonded to the external periphery of said inner pliable plastic hose parallel to a neutral axis thereof;
   a plurality of sensors, placed within said inner pliable plastic hose cavity at preselected locations therealong and attached to said conductors in such a fashion as to preclude the need for intersectional couplings;
   a long continuous outer pliable plastic hose superposed over and in contact with said inner pliable plastic hose and said plurality of conductors; and
   a plurality of longitudinal strength members equally spaced around and embedded within the wall of said outer pliable plastic hose.

2. A continuous, oil filled towed array without intersectional couplings according to claim 1 wherein said plurality of conductors further comprise:
   a plurality of electrical wires having insulating jackets disposed thereover; and
   a plurality of optical fibers having protective plastic jackets disposed thereover.

3. A continuous, oil filled towed array without intersectional couplings according to claim 2 wherein said plurality of electrical wires and said plurality of optical fibers are fixedly attached to the outer surface of said inner pliable plastic hose by solvent bonding of the jackets thereof.

4. A continuous, oil filled towed array without intersectional couplings according to claim 3 wherein said plurality of sensors further comprise piezoelectric hydrophones.

5. A continuous, oil filled towed array without intersectional couplings according to claim 3 wherein said plurality of sensors further comprise optical hydrophones.

6. A continuous, oil filled towed array without intersectional couplings comprising:

a long continuous inner pliable plastic hose having an internal cavity therethrough;

a plurality of conductors embedded within the wall of said inner pliable plastic hose in a helical wound pattern, said conductors being parallel to a neutral axis thereof;

a plurality of sensors, placed within said inner pliable plastic hose cavity at preselected locations therealong and attached to said conductors in such a fashion as to preclude the need for intersectional couplings;

a long continuous outer pliable plastic hose superposed over and in contact with said inner pliable plastic hose; and a plurality of longitudinal strength members equally spaced around and embedded within the wall of said outer pliable plastic hose.

7. A continuous, oil filled towed array without intersectional couplings according to claim 6 wherein said plurality of conductors further comprise:

a plurality of electrical wires having insulating jackets disposed thereover; and a plurality of optical fibers having protective plastic jackets disposed thereover.

8. A continuous, oil filled array without intersectional couplings according to claim 7 wherein said plurality of sensors further comprise piezoelectric hydrophones.

9. A continuous, oil filled towed array without intersectional couplings according to claim 7 wherein said plurality of sensors further comprise optical hydrophones.

10. A process for making a continuous, oil filled towed array without intersectional couplings comprising the steps of:

cutting a plurality of first incisions through the outer layer of a long continuous pliable plastic hose at preselected locations therealong, said plurality of first incisions being parallel to the longitudinal axis of said hose and positioned between two adjacent longitudinal strength members embedded within said outer layer of said hose;

cutting a plurality of second incisions in the inner hose layer, to access the cavity running therethrough, through the opening in said outer layer created by cutting said plurality of first incisions, said plurality of second incisions being parallel to the helically wound conductors attached to the long continuous pliable plastic hose inner layer, now exposed, by said plurality of first incisions, said helically wound conductors lying along a previously determined neutral axis thereof;

severing the adjacent conductors on either side of said plurality of second incisions;

inserting a plurality of sensors within the plurality of hose cavities exposed by making said plurality of second incisions;

attaching said plurality of sensors to the severed ends of the adjacent conductors at each sensor location;

sealing the sensor-conductor junction with waterproof material;

sealing said plurality of second incisions using a plastic solvent;

sealing said plurality of first incisions using a plastic solvent; and filling said array with a lightweight buoyant oil.

11. The process for making a continuous, oil filled towed array without intersectional couplings according to claim 10 wherein the process of determining the helix angle of said neutral axis further comprises the steps of:

determining the increase in hose length using the total axial force applied to said array during towing operations and the strength of said hose;

determining the decrease in diameter of said hose corresponding to said increase in hose length;

determining the decrease in circumference of said hose corresponding to said decrease in diameter; and determining the helix angle of said neutral axis using said decrease in circumference together with said increase in hose length, which quantities are orthogonal to one another.

* * * * *